United States Patent
Abraham et al.

(10) Patent No.: US 10,154,485 B2
(45) Date of Patent: Dec. 11, 2018

(54) BEACONS FOR TIERED SHARING OF SPECTRUM

(71) Applicant: QUALCOMM Incorporated, San Diego, CA (US)

(72) Inventors: Santosh Paul Abraham, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 14/858,779

(22) Filed: Sep. 18, 2015

(65) Prior Publication Data
US 2016/0286549 A1 Sep. 29, 2016

Related U.S. Application Data

(60) Provisional application No. 62/137,651, filed on Mar. 24, 2015.

(51) Int. Cl.
*H04W 16/14* (2009.01)
*H04W 40/24* (2009.01)
(Continued)

(52) U.S. Cl.
CPC ....... *H04W 72/0446* (2013.01); *H04W 16/14* (2013.01); *H04W 40/244* (2013.01);
(Continued)

(58) Field of Classification Search
None
See application file for complete search history.

(56) References Cited

U.S. PATENT DOCUMENTS

| 8,830,815 B2 * | 9/2014 | Vermani | H04L 5/0053 370/208 |
| 2005/0271010 A1 * | 12/2005 | Capretta | H04W 72/1215 370/329 |

(Continued)

FOREIGN PATENT DOCUMENTS

| WO | WO-2014117135 A2 | 7/2014 |
| WO | WO-2015017463 A2 | 2/2015 |

OTHER PUBLICATIONS

Abdelhadi, Ahmed et al., A Multi-Tier Wireless Spectrum Sharing System Leveraging Secure Spectrum Auctions, Mar. 17, 2015, Cornell University, Ver. 1, pp. 1-11.*

(Continued)

*Primary Examiner* — Noel R Beharry
*Assistant Examiner* — Rodrick Mak
(74) *Attorney, Agent, or Firm* — Haynes and Boone, LLP

(57) ABSTRACT

Aspects of the present disclosure relate generally to wireless communication systems, and more particularly, to beacons for shared spectrum operation among multiple tiers of users. For example, a method for wireless communication is provided that includes generating, with a second tier wireless communication device of a network operating in a shared spectrum, a beacon that includes a short training field (STF), a long training field (LTF), and a beacon information field, the beacon information field including data about the network; and transmitting, from the second tier wireless communication device of the network, the beacon during a time slot of a sub-frame such that communications over the shared spectrum are coordinated based on the beacon.

70 Claims, 9 Drawing Sheets

(51) Int. Cl.
    *H04W 48/08*     (2009.01)
    *H04W 48/12*     (2009.01)
    *H04W 72/04*     (2009.01)
    *H04W 74/00*     (2009.01)

(52) U.S. Cl.
    CPC ....... *H04W 48/08* (2013.01); *H04W 72/0453* (2013.01); *H04W 48/12* (2013.01); *H04W 74/002* (2013.01)

(56) References Cited

U.S. PATENT DOCUMENTS

| | | | |
|---|---|---|---|
| 2006/0098606 A1 | 5/2006 | Pandey et al. | |
| 2006/0227801 A1* | 10/2006 | Nanda | H04L 47/15 370/447 |
| 2009/0059855 A1 | 3/2009 | Nanda et al. | |
| 2009/0245195 A1* | 10/2009 | Bhattad | H04L 5/0053 370/329 |
| 2011/0064420 A1* | 3/2011 | Rajagopal | H04B 10/1125 398/154 |
| 2013/0196632 A1* | 8/2013 | Horn | H04W 12/06 455/411 |
| 2013/0230035 A1 | 9/2013 | Grandhi et al. | |
| 2014/0080535 A1 | 3/2014 | Gauvreau et al. | |
| 2014/0237547 A1* | 8/2014 | Bose | H04W 16/14 726/3 |
| 2014/0348148 A1 | 11/2014 | You et al. | |
| 2015/0057011 A1* | 2/2015 | Di Girolamo | H04W 74/0808 455/454 |
| 2015/0146808 A1* | 5/2015 | Chu | H04L 5/0037 375/260 |
| 2015/0188592 A1* | 7/2015 | Solondz | H04B 1/3888 455/501 |
| 2015/0223069 A1* | 8/2015 | Solondz | H04W 12/08 370/329 |
| 2015/0264699 A1* | 9/2015 | Fwu | H04L 5/0001 370/329 |
| 2015/0327262 A1* | 11/2015 | Kwon | H04W 72/1289 370/329 |
| 2015/0373554 A1* | 12/2015 | Freda | H04W 16/14 455/450 |
| 2016/0105304 A1* | 4/2016 | Kwon | H04L 27/2665 370/338 |
| 2016/0242031 A1* | 8/2016 | Ojanen | H04W 28/16 |

OTHER PUBLICATIONS

Le, Tan et al., On a new incentive and market based framework for multi-tier shared spectrum access systems, 2014, IEEE International Symposium on Dynamic Spectrum Access Networks (DYSPAN), pp. 477-488.*

International Search Report and Written Opinion—PCT/US2016/020053—ISA/EPO—dated May 27, 2016.

* cited by examiner

BEACONS FOR TIERED SHARING OF SPECTRUM

CROSS-REFERENCE TO RELATED APPLICATIONS

The present application claims priority to and the benefit of U.S. Provisional Patent Application No. 62/137,651, filed Mar. 24, 2015, which is hereby incorporated by reference in its entirety.

TECHNICAL FIELD

Aspects of the present disclosure relate generally to wireless communication systems, and more particularly, to beacons for shared spectrum operation among multiple tiers of users.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method for wireless communication is provided that includes generating, with a second tier wireless communication device of a network operating in a shared spectrum, a beacon that includes a short training field (STF), a long training field (LTF), and a beacon information field, the beacon information field including data about the network; and transmitting, from the second tier wireless communication device of the network, the beacon during a time slot of a sub-frame such that communications over the shared spectrum are coordinated based on the beacon.

In an additional aspect of the disclosure, a method for wireless communication is provided that includes receiving, at a wireless communication device, a beacon from a second tier wireless communication device of a network operating in a shared spectrum during a time slot of a sub-frame, the beacon including a short training field (STF), a long training field (LTF), and a beacon information field, the beacon information field including data about the network; and coordinating, by the wireless communication device, communications over the shared spectrum based on the beacon.

In an additional aspect of the disclosure, a wireless communication device is provided that includes at least one processor; a memory coupled to the at least one processor; wherein the at least one processor is configured to: generate a beacon that includes a short training field (STF), a long training field (LTF), and a beacon information field, the beacon information field including data about a network operating in a shared spectrum; and transmit, by a transmitter of the wireless communication device, the generated beacon during a time slot of a sub-frame such that communications over the shared spectrum are coordinated based on the beacon.

In an additional aspect of the disclosure, a wireless communication device is provided that includes a receiver that receives a beacon from a second tier wireless communication device of a network operating in a shared spectrum during a time slot of a sub-frame, the beacon including a short training field (STF), a long training field (LTF), and a beacon information field, the beacon information field including data about the network; and at least one processor in communication with the receiver; a memory coupled to the at least one processor; wherein the at least one processor is configured to: coordinate communications over the shared spectrum based on the beacon received by the receiver.

In an additional aspect of the disclosure, wireless communication device is provided that includes means for generating, with a second tier wireless communication device of a network operating in a shared spectrum, a beacon that includes a short training field (STF), a long training field (LTF), and a beacon information field, the beacon information field including data about the network; and means for transmitting, from the second tier wireless communication device of the network, the beacon during a time slot of a sub-frame such that communications over the shared spectrum are coordinated based on the beacon.

In an additional aspect of the disclosure, a wireless communication device is provided that includes means for receiving, at a wireless communication device, a beacon from a second tier wireless communication device of a network operating in a shared spectrum during a time slot of a sub-frame, the beacon including a short training field (STF), a long training field (LTF), and a beacon information field, the beacon information field including data about the network; and means for coordinating, by the wireless communication device, communications over the shared spectrum based on the beacon.

In an additional aspect of the disclosure, a computer readable medium having program code recorded thereon is provided, the program code including code for causing a computer to generate a beacon that includes a short training field (STF), a long training field (LTF), and a beacon information field, the beacon information field including data about a network operating in a shared spectrum; and code for causing the computer to transmit the beacon during a time slot of a sub-frame such that communications over the shared spectrum are coordinated based on the beacon.

In an additional aspect of the disclosure, a computer readable medium having program code recorded thereon is provided, the program code including code for causing a computer to receive a beacon from a second tier wireless communication device of a network operating in a shared spectrum during a time slot of a sub-frame, the beacon including a short training field (STF), a long training field (LTF), and a beacon information field, the beacon information field including data about the network; and code for causing the computer to coordinate communications over the shared spectrum based on the beacon.

Additional aspects, features, and advantages of the present disclosure will become apparent from the following detailed description.

DETAILED DESCRIPTION

Figure 1:
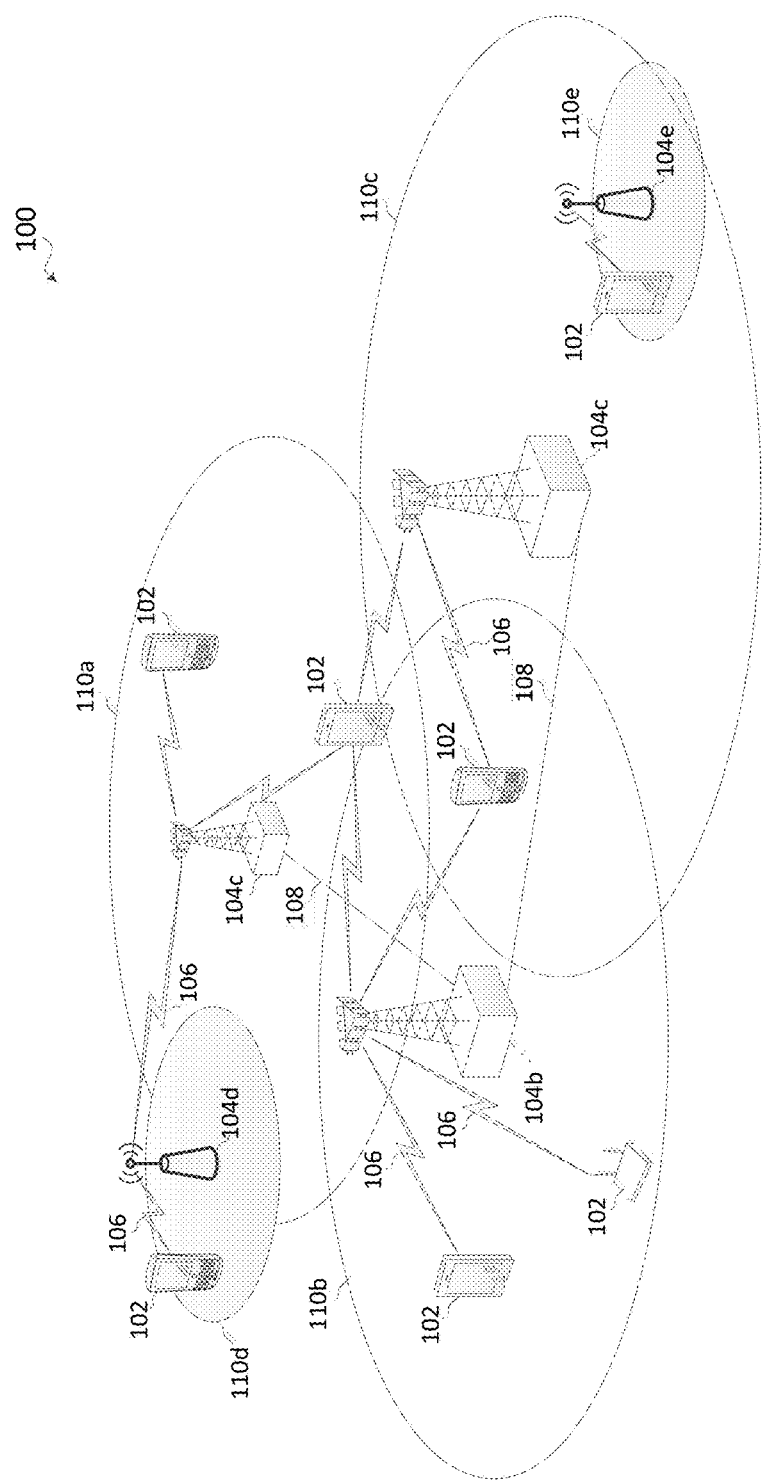
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA, LTE networks, GSM networks, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. Embodiments of this disclosure are directed to any type of modulation scheme that may be used on any one or more of the above-recited networks and/or those yet to be developed.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Embodiments of this disclosure can be implemented in any type of shared spectrum having multiple tiers of users, including both licensed and unlicensed spectrums.

FIG. 1 illustrates a wireless communication network 100 in accordance with various aspects of the present disclosure. The wireless communication network 100 may include a number of UEs 102, as well as a number of base stations 104. The base stations 104 may include an evolved Node B (eNodeB). A base station may also be referred to as a base transceiver station, a node B, or an access point. A base station 104 may be a station that communicates with the UEs 102 and may also be referred to as a base station, a node B, an access point, and the like.

The base stations 104 communicate with the UEs 102 as indicated by communication signals 106. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104. The base stations 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The wireless communication network 100 is one example of a network to which various aspects of the disclosure apply.

Each base station 104 may provide communication coverage for a particular geographic area. In 3GPP, the term "cell" can refer to this particular geographic coverage area of a base station and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. And, a base station for a femto cell may be referred to as a femto base station or a home base station. In the example shown in FIG. 1, the base stations 104a, 104b and 104c are examples of macro base station for the coverage areas 110a, 110b and 110c, respectively. The base stations 104d and 104e are examples of pico and/or femto base stations for the coverage areas 110d and 110e, respectively. An base station 104 may support one or multiple (e.g., two, three, four, and the like) cells.

The wireless network 100 may also include relay stations. A relay station is a station that receives a transmission of data and/or other information from an upstream station (e.g., a base station, a UE, or the like) and sends a transmission of the data and/or other information to a downstream station (e.g., another UE, another base station, or the like). A relay station may also be a UE that relays transmissions for other UEs. A relay station may also be referred to as a relay base station, a relay UE, a relay, and the like.

The wireless network 100 may support synchronous or asynchronous operation. For synchronous operation, the base stations 104 may have similar frame timing, and transmissions from different base stations 104 may be approximately aligned in time. For asynchronous operation, the base stations 104 may have different frame timing, and transmissions from different base stations 104 may not be aligned in time.

In some implementations, the wireless network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
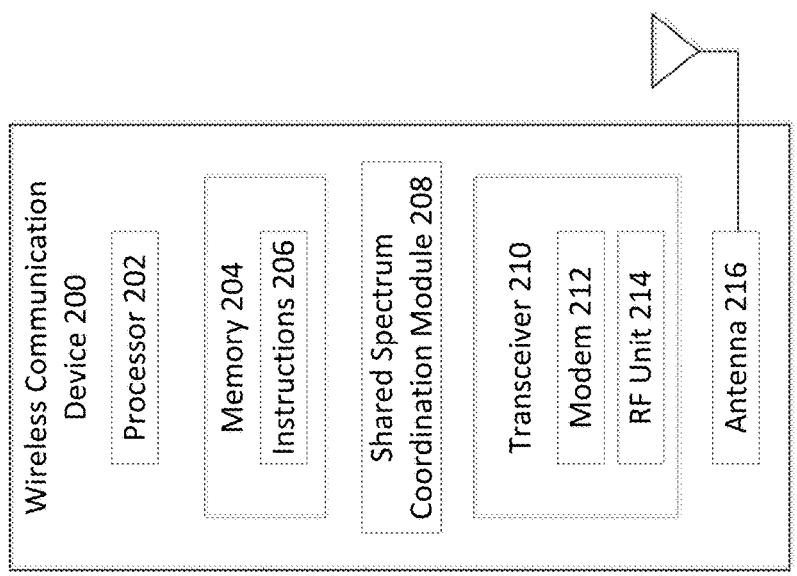
FIG. 2 is a block diagram of an exemplary wireless communication device according to embodiments of the present disclosure.

FIG. 2 is a block diagram of an exemplary wireless communication device 200 according to embodiments of the present disclosure. The wireless communication device 200 may be a base station and/or UE having any one of many configurations described above. In addition, the wireless communication device 200 may be an Internet of Things (IoT) or Internet of Everything (IoE) device. In this regard, IoT or IoE devices may have limited power resources because they are integrated with devices or objects having other primary functionalities to render those devices or objects "smart," and may need to be able to operate for long periods of time without replacement or recharge, e.g. days, weeks, months, or years.

As shown, the wireless communication device 200 may include a processor 202, a memory 204, a shared spectrum coordination module 208, a transceiver 210 (including a modem 212 and RF unit 214), and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to wireless communication devices 200 introduced above with respect to FIG. 1 and discussed in more detail below. In particular, the processor 202 may be utilized in combination with the other components of the wireless communication device 200, including shared spectrum coordination module 208, to perform the various functions associated with the master and/or slave devices of second and/or third tier networks as described in greater detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the wireless communication devices 200 acting as the master and/or slave devices of second and/or third tier networks in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The shared spectrum coordination module 208 may be used for various aspects of the present disclosure. For example, the shared spectrum coordination module 208 may be involved in performing the actions of the master and/or slave devices of second and/or third tier systems in accordance with the present disclosure. In particular, the shared spectrum coordination module 208 can generate a beacon signal for transmission by the wireless communication device 200 in accordance with the present disclosure. The shared spectrum coordination module 208 may additionally be involved in interpreting beacon signals received from other wireless communication devices and/or executing instructions based on the received beacon signals to facilitate coordinated communication over a shared spectrum in accordance with the present disclosure. For example, the shared spectrum coordination module 208 can be configured to utilize beacon signals for the coordinated sharing of a shared spectrum across multiple tiers of devices/systems as described with respect to FIGS. 5-9 below. It is understood that the functionality of the shared spectrum coordination module 208 may be accomplished using hardware, software executed by a processor, firmware, or any combination thereof. Further, in some implementations the shared spectrum coordination module 208 is not a separate component, but instead utilizes aspects of the other components of the wireless communication device 200, such as the processor 202, memory 204, transceiver 210, and antenna 216, to perform its functions.

As shown, the transceiver 210 may include the modem subsystem 212 and the radio frequency (RF) unit 214. The transceiver 210 can be configured to communicate bi-directionally with other devices, such as UEs 102 and/or base stations 104. The modem subsystem 212 may be configured to modulate and/or encode the data from the shared spectrum coordination module 208 according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 102 or a base station 104. Although shown as integrated together in transceiver 210, the modem subsystem 212 and the RF unit 214 may be separate devices that are coupled together at the wireless communication device 200 to enable the wireless communication device 200 to communicate with other devices.

The RF unit 214 may provide the modulated and/or processed data, e.g. data packets (or, more generally, data messages that may contain one or more data packets and other information), to the antenna 216 for transmission to one or more other devices. This may include, for example, transmission of beacons to other devices according to embodiments of the present disclosure. The antenna 216 may further receive data messages transmitted from other devices and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
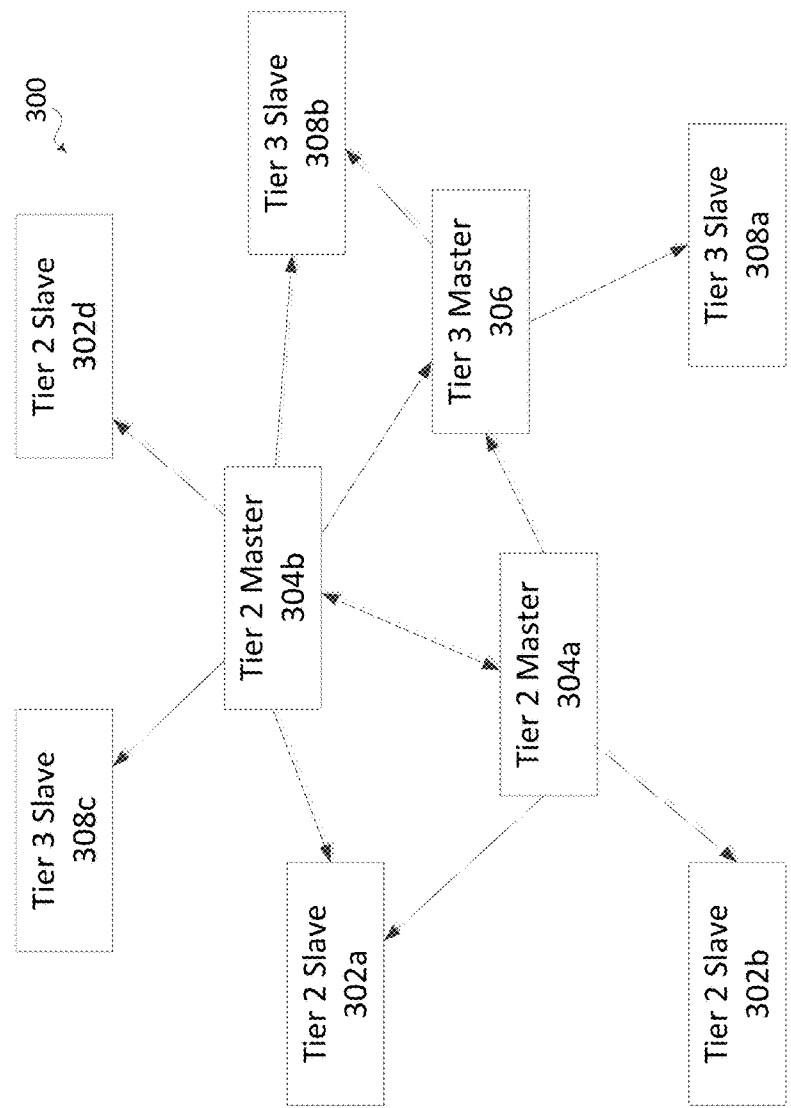
FIG. 3 is a block diagram of an exemplary multi-tiered wireless communication network according to embodiments of the present disclosure.

FIG. 3 illustrates a block diagram illustrating aspects of a multi-tiered communication system according to the present disclosure. The multi-tiered system 300 may have three or more tiers (including four, five, six, or more tiers) of devices and/or networks. Each tier may be specified for particular systems, such as incumbent systems, general access systems, priority access systems, and/or other access-based systems, including open or unlicensed spectrum systems. In this regard, when the present disclosure refers to a "second tier" or "tier 2" device and/or network, this means that there is one or more "first tier" or "tier 1" device(s) and/or network(s) that has(have) preferential and/or priority access to the shared spectrum relative to the "second tier" or "tier 2" device and/or network. Similarly, when the present disclosure refers to a "third tier" or "tier 3" device and/or network, this means that there is one or more "first tier" or "tier 1" device(s) and/or network(s) as well as one or more "second tier" or "tier 2" device(s) and/or network(s) that has(have) preferential and/or priority access to a shared spectrum relative to the "third tier" or "tier 3" device and/or network. However, the "second" and "third" tier device(s) and/or network(s) need not be at the second and third levels of priority, respectively. That is, a "second tier" device may be at a third, fourth, or lower level of priority access for the shared spectrum relative to all of the devices/networks that share the spectrum. Similarly, a "third tier" device may be at a fourth, fifth, or lower level of priority access for the shared spectrum relative to all of the devices/networks that share the spectrum.

As shown in FIG. 3, the system 300 can include second tier slave devices 302, second tier master devices 304, third tier master devices 306, and third tier slave device 308. Communications between the devices of system 300, in particular through the use of beacon signals in accordance with the present disclosure, facilitate the coordinated sharing the shared spectrum.

The available wireless spectrum usable for wireless communication may be shared in multiple ways. Vertical sharing is sharing of the spectrum between users having a different priority access to the spectrum. For example, vertical sharing may occur between a first tier user or incumbent and a second tier or priority license holder. Likewise, vertical sharing may occur between a second tier user having priority access to the shared spectrum and a third tier user having a lower access priority or general access to the shared spectrum. A first tier user or incumbent may be the primary spectrum user, such as a governmental entity, agency, branch of military, a public system, satellite communication system, television station, or the like. The first tier user or incumbent may not use the spectrum at all times, on nationwide basis, or in its entirety. In that case, a regulatory authority may license one or more entities to use the spectrum when and/or where it is not used by the first tier or incumbent user. The second tier or priority license holder may be such a primary licensee of the spectrum from the first tier user. A second tier user may include commercial communication service providers, operators, or the like. The third tier users may include users with licenses that have a lower priority to the second tier users, such as wireless internet service providers (WISPs).

Sharing between first tier and other tier users (e.g., second and/or third tier users) may be based on database lookup where the other tier users may look up available spectrum access times, locations, or the like. In this regard, tier 1 devices and/or systems may report unused spectrum to one or more first tier spectrum controller(s). Based on the unused spectrum of the tier 1 devices and/or systems, the first tier spectrum controller(s) may notify tier 2 and/or tier 3 devices, systems, and/or controllers of the available spectrum. Similarly, tier 2 devices and/or systems may report unused spectrum to one or more second tier spectrum controller(s). Based on the unused spectrum of the tier 2 devices and/or systems, the second tier spectrum controller(s) may notify tier 3 devices, systems, and/or controllers of the available spectrum. Although each tier has been described as being managed separately with one or more spectrum controllers, multiple tiers can be managed by one entity, multiple licensees within a tier can be managed by one entity, and/or combinations thereof. The spectrum controller(s) may be in communication with one or more databases where the unused spectrum data is stored for retrieval by other wireless communications devices for use in accordance with the present disclosure.

Sharing between first tier and other tier users may also be based on sensing. For example, radar operators typically have first tier access to shared spectrum. Prior to transmitting on the shared spectrum, second or third tier users may first detect whether radar pulses may be resident on the portion of the spectrum intended for second or third tier user access. Second and third tier users may vacate the spectrum entirely whenever a first tier user is detected on the spectrum. Similarly, third tier users may vacate the spectrum entirely whenever a second tier user is detected on the spectrum. Further, aspects of the beacon signals of the present disclosure allow second and/or third tier devices and/or systems to operate in the presence of higher tier users by utilizing portions of the spectrum not utilized by the higher tier users. In this regard, while a higher tier user may be present, there may still be available bandwidth to allow the lower tier device(s) to operate. Accordingly, the lower tier devices need not abandon the shared spectrum entirely when a higher tiered user is present. However, the lower tier devices need to coordinate communications over the shared spectrum so as to not interfere with the communications of the higher tier user(s). To this end, the beacon signals of the present disclosure (described in greater detail below) are particularly suited for coordinating this multi-tier sharing of the spectrum.

The available spectrum may also be shared horizontally. In horizontal sharing, spectrum is shared between devices and/or systems within the same tier. For example, horizontal sharing may occur between multiple first tier users, between multiple second tier users, or between multiple third tier users. In general, first tier or incumbent user may employ unmodified/legacy technology, while second and third tier users may employ technologies that adhere to various spectrum-specific sharing or coexistence procedures. Generally, any existing or future developed sharing or coexistence procedures can be utilized to coordinate the sharing of the spectrum by devices/networks having the same tier or priority access levels. In some implementations the beacon signals of the present disclosure are utilized to coordinate common-tier sharing of the spectrum in addition to the multi-tiered sharing of the spectrum.

The wireless communication devices of the present disclosure can be categorized as master and/or slave devices. There can be master and/or slave devices at each tier level. Accordingly, there can be zero, one, two, or more master devices and/or zero, one, two, or more slave devices at each access level. For example, the exemplary system 300 shown in FIG. 3 includes three second tier slave devices 302*a*, 302*b*, and 302*c*, two second tier master devices 304*a* and 304*b*, one third tier master device 306, and three third tier slave devices 308*a*, 308*b*, and 308*c*. Beacon signals transmitted from one or more of the devices are utilized to coordinate sharing of the spectrum across the different devices.

Generally, second tier master devices are configured to detect the presence of a first tier device/system (e.g., via a database lookup and/or sensing), generate a second tier beacon (e.g., using a beacon format as described below with respect to FIGS. 5-7), and transmit the second tier beacon to other wireless communication devices (e.g., second tier slave devices, second tier master devices, third tier master devices, third tier slave devices, etc.). In this regard, the second tier master can determine when transmissions are allowed by second tier devices and/or lower tier devices based on detecting the presence, or lack thereof, of the first tier device/system. Accordingly, the second tier master devices may also generate and/or transmit enablement signals to slave devices, including slave devices on the same tier and/or lower tiers (i.e., third, fourth, or lower tiers). The enablement signals can instruct the slave devices as to when communications are allowed over the shared spectrum by the slave devices. Similarly, the second tier master devices may also generate and/or transmit shutdown signals to slave devices, including slave devices on the same tier and/or lower tiers (i.e., third, fourth, or lower tiers). The shutdown signals can instruct the slave devices as to when communications are not allowed over the shared spectrum by the slave devices. The enablement and/or shutdown signals can be included as part of the second tier beacon and/or sent separately. Typically, a base station 104 will be capable of serving as a master device for its corresponding tier of access. However, any type of wireless communication device having sufficient functionality to perform the required functions of a master device can serve as a master device.

Second tier slave devices are configured to receive a second tier beacon from a second tier master and coordinate transmissions over the shared spectrum based on the received second tier beacon. In this regard, second tier slave devices may not have the required functionality to determine on its own when transmissions are allowed by second tier devices (or lower tier devices). Accordingly, the second tier slave devices rely upon the beacon signals transmitted by second tier master devices to coordinate transmissions in a manner that does not interfere with devices/systems having a higher priority to the spectrum. In this regard, the second tier slave device may receive an enablement signal from the second tier master, either as part of the second tier beacon or separately, that includes instructions as to when the second tier slave device is allowed to communicate over the shared spectrum. Similarly, the second tier slave device may receive a shutdown signal from the second tier master, either as part of the second tier beacon or separately, that includes instructions as to when the second tier slave device is not allowed to communicate over the shared spectrum.

Third tier master devices are configured to detect the presence of a first tier device/system (e.g., via a database lookup and/or sensing) and/or a second tier device/system (e.g., via a database lookup and/or sensing), generate a third tier beacon (e.g., using a beacon format as described below with respect to FIGS. 5-7), and transmit the third tier beacon to other wireless communication devices (e.g., third tier slave devices, third tier master devices, fourth tier master devices, fourth tier slave devices, etc.). In this regard, the third tier master can determine when transmissions are allowed by third tier devices and/or lower tier devices based on detecting the presence, or lack thereof, of a first tier device/system and/or a second tier device/system. For example, the third tier master may determine the time epochs reserved by second tier devices and identify the remaining time that is available for third tier transmissions. In this regard, the third tier master devices may also generate and/or transmit enablement signals to third tier slave devices and/or lower tier devices (i.e., fourth, fifth, or lower tiers). The enablement signals can instruct the third tier slave devices as to when communications are allowed over the shared spectrum by the third tier slave devices. Similarly, the third tier master devices may also generate and/or transmit shutdown signals to third tier slave devices and/or lower tier devices (i.e., fourth, fifth, or lower tiers). The shutdown signals can instruct the third tier slave devices as to when communications are not allowed over the shared spectrum by the third tier slave devices. The enablement and/or shutdown signals can be included as part of the third tier beacon and/or sent separately.

In some instances, the third tier master device may only be able to detect the presence of second tier devices/systems, not first tier devices/systems. In such instances, the third tier master may only operate when a second tier master is present so as to not interfere with the first tier devices/systems. That is, since the third tier master device cannot detect the first tier devices/systems itself, it relies upon a second tier master for detection of the first tier devices/systems. Accordingly, to ensure that such third tier devices/systems do not interfere with first tier operations, the third tier master device may only operate when a second tier master device is present and indicates that third tier operation is allowed.

Third tier slave devices are configured to receive a second tier beacon from a second tier master and/or a third tier beacon from a third tier master and coordinate transmissions over the shared spectrum based on the received second tier beacon and/or the received third tier beacon. In this regard, third tier slave devices may not have the required functionality to determine on its own when transmissions are allowed by third tier devices (or lower tier devices). Accordingly, the third tier slave devices rely upon the beacon signals transmitted by second tier master devices and/or the third tier master devices to coordinate transmissions in a manner that does not interfere with devices/systems having a higher priority to the spectrum. In this regard, the third tier slave device may receive an enablement signal from the second tier master and/or the third tier master, either as part of the second/third tier beacons or separately, that includes instructions as to when the third tier slave device is allowed to communicate over the shared spectrum. Similarly, the third tier slave device may receive a shutdown signal from the second tier master and/or the third tier master, either as part of the second/third tier beacons or separately, that includes instructions as to when the third tier slave device is not allowed to communicate over the shared spectrum. In some instances, the third tier slave device may only be able to detect and/or interpret beacons/signals from third tier master devices, not second tier master devices. In such instances, the third tier slave may only operate when a third tier master is present so as to not interfere with the second tier or higher devices/systems.

Referring more specifically to the system 300 shown in FIG. 3, aspects of the signaling between the different master and slave devices is illustrated. As shown, second tier master 304a sends beacons, enablement signals, and/or shutdown signals to second tier slaves 302a and 302b, second tier master 304b, and third tier master 306. As discussed above, the second tier slaves 302a and 302b can utilize the beacons, enablement signals, and/or shutdown signals received from the second tier master 304a to coordinate second tier transmissions over the shared spectrum.

Further, the second tier master 304b can utilize the beacons, enablement signals, and/or shutdown signals received from the second tier master 304a to coordinate the horizontal sharing of the spectrum. In that regard, the second tier master 304b may also send beacons, enablement signals, and/or shutdown signals to the second tier master 304a. In this regard, in some implementations the second tier master 304a and the second tier master 304b may be devices from separate systems of the same operator. In other implementations, the second tier master 304a and the second tier master 304b may be devices from separate systems of different operators. When the second tier master devices 304a and 304b have a common operator, the signaling between the second tier master 304a and the second tier master 304b can be utilized to facilitate bandwidth partitioning and cell planning, interference management, TDM partitioning across base stations, etc. When the second tier master devices 304a and 304b have different operators, the signaling between the second tier master 304a and the second tier master 304b can be utilized to share information about bandwidth usage, amount of time occupied/reserved by each system, potential interference (e.g., by using RSSI measurements) that can in turn be used to set MCS, RAT(s) being used, channel control coordination when the systems are using the same RAT, etc.

The third tier master 306 can utilize the beacons, enablement signals, and/or shutdown signals received from the second tier master 304a to coordinate the vertical sharing of the spectrum. In particular, based on the beacons, enablement signals, and/or shutdown signals received from the second tier master 304a the third tier master 306 can pass on beacons, enablement signals, and/or shutdown signals to the third tier slave devices 308a and 308b, as shown. As discussed above, the third tier slaves 308a and 308b can utilize the beacons, enablement signals, and/or shutdown signals received from the third tier master 306 to coordinate second tier transmissions over the shared spectrum.

As also shown, second tier master 304b sends beacons, enablement signals, and/or shutdown signals to second tier slaves 302a and 302d, second tier master 304a, third tier master 306, and third tier slaves 308b and 308c. The second tier slaves 302a and 302d can utilize the beacons, enablement signals, and/or shutdown signals received from the second tier master 304b to coordinate second tier transmissions over the shared spectrum. In this regard, second tier slave 302a may receive beacons, enablement signals, and/or shutdown signals from both second tier master 304a and second tier master 304b. Accordingly, in some instances the second tier slave 302a coordinates communications to the beacons, enablement signals, and/or shutdown signals from both second tier master 304a and second tier master 304b.

As discussed above, the third tier slave devices 308b and 308c can utilize the beacons, enablement signals, and/or shutdown signals received from the second tier master 304b to coordinate third tier transmissions over the shared spectrum. In this regard, third tier slave 308b may receive beacons, enablement signals, and/or shutdown signals from both second tier master 304b and third tier master 306. Accordingly, in some instances the third tier slave 308b coordinates communications to the beacons, enablement signals, and/or shutdown signals from both second tier master 304b and third tier master 306. In this regard, the third tier slave 308b may ignore the beacons, enablement signals, and/or shutdown signals from one of the second tier master 304b or third tier master 306 in favor of the other. For example, in some instances the third tier slave 308b may be able to detect the presence of the second tier master 304b from a short training field of a beacon transmitted from the second tier master 304b, but not be able to determine a time epoch reserved by the second tier master 304b. Accordingly, based solely on the communication with the second tier master 304b the third tier slave 308b would need to cease all communications so as not to interfere with the time epoch of the second tier master 304b. However, the third tier master 306 may be able to determine the time epoch reserved by the second tier master 304b based on the beacon transmitted from the second tier master 304b and identify a remaining time slot suitable for third tier transmissions by the third tier slave 308b. As a result, the beacons, enablement signals, and/or shutdown signals from third tier master 306 may still allow for communications by the third tier slave 308b even in the presence of the second tier master 304b. In some instances, the third tier master 306 may not receive the beacons, enablement signals, and/or shutdown signals from one of the second tier master 304b (e.g., due to relative locations of the devices) such that the third tier master 306 is not aware of the potential interference of the third tier slave 308b with the second tier communications. In such instances, the third tier slave 308b may ignore the beacons, enablement signals, and/or shutdown signals from the third tier master 306 and coordinate communications based on the beacons, enablement signals, and/or shutdown signals from the second tier master 304b. Alternatively, the third tier slave 308b may coordinate communications based on the beacons, enablement signals, and/or shutdown signals from third tier master 306 to the extent that they are consistent with and/or do not interfere with the beacons, enablement signals, and/or shutdown signals from the second tier master 304b. Accordingly, when the third tier slave 308b receives beacons, enablement signals, and/or shutdown signals from both second tier master 304b and third tier master 306, it may use one or more rules (e.g., stored in accessible memory) to determine which of the beacons, enablement signals, and/or shutdown signals should be relied upon to coordinate communications over the shared spectrum.

While the master and slave devices are described above as being separate devices having different functionalities, in some instances a single wireless communication device may act as both a master device and a slave device. For example, in some instances a second tier master device (e.g., second tier master 304b) may also act as a second tier slave device relative to communications from other second tier master devices (e.g., second tier master 304a). Further, while the present disclosure focuses on second and third tier master and slave devices for the sake of clarity, it is understood that master and slave devices having similar functionalities can be included for any number of tiers of access priority and that the concepts of the present disclosure are equally applicable to any number of tiers of access priority to a shared spectrum.

Figure 4:
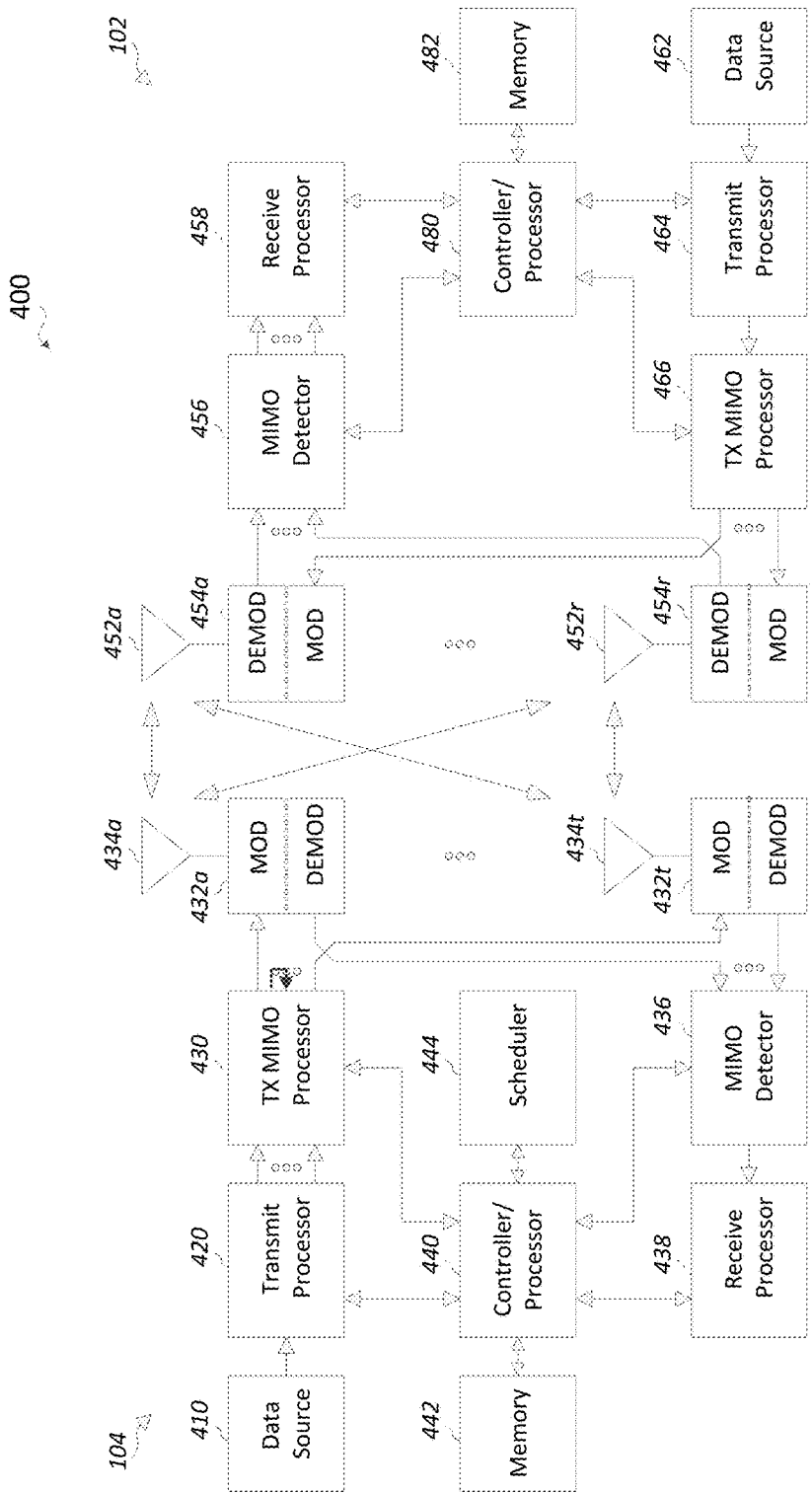
FIG. 4 is a block diagram illustrating an exemplary transmitter and receiver system in accordance with various aspects of the present disclosure.

FIG. 4 shows a block diagram illustrating communication between two wireless communication devices of a MIMO system 400 in accordance with the present disclosure. For sake of clarity in explanation, a base station 104 and a UE 102 are shown. However, it is understood that the following description is applicable to communication between any two wireless communication devices in accordance with the present disclosure, including the various master and slave communications shown in FIG. 3. In this regard, the two wireless communication devices may be of the same access tier or different access tiers. Further, the two wireless communication devices may include two master devices, a master device and a slave device, or two slave devices.

At the base station 104, a transmit processor 420 may receive data from a data source 410 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via antennas 434a through 434t, respectively.

At the UE 102, antennas 452a through 452r may receive the downlink signals from the base station 104 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 102, and provide decoded control information to a controller/processor 480.

On the uplink, at the UE 102, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 102. At the base station 102, the uplink signals from the UE 102 may be received by the antennas 434, processed by the demodulators 432, detected by a MIMO detector 436, if applicable, and further processed by a receive processor 438 to obtain decoded data and control information sent by the UE 102. The processor 438 may provide the decoded data to a data sink and the decoded control information to the controller/processor 440.

The controllers/processors 440 and 480 may direct the operation at the base station 104 and the UE 102, respectively. The controller/processor 440 and/or other processors and modules at the base station 102 may perform or direct the execution of various processes for the techniques described herein, including the creation, transmission, receipt, and/or processing of beacon signals for coordinated sharing of a shared spectrum as described with respect to FIGS. 5-9 below. The controllers/processor 480 and/or other processors and modules at the UE 102 may also perform or direct the execution of the various processes for the techniques described herein, including the creation, transmission, receipt, and/or processing of beacon signals for coordinated sharing of a shared spectrum as described with respect to FIGS. 5-9 below. In this regard, the memories 442 and 482 may store data and program codes for the base station 104 and the UE 102, respectively, to perform or direct the execution of these various processes. A scheduler 444 may schedule wireless communication devices for data transmission on the downlink and/or uplink.

Figure 5:
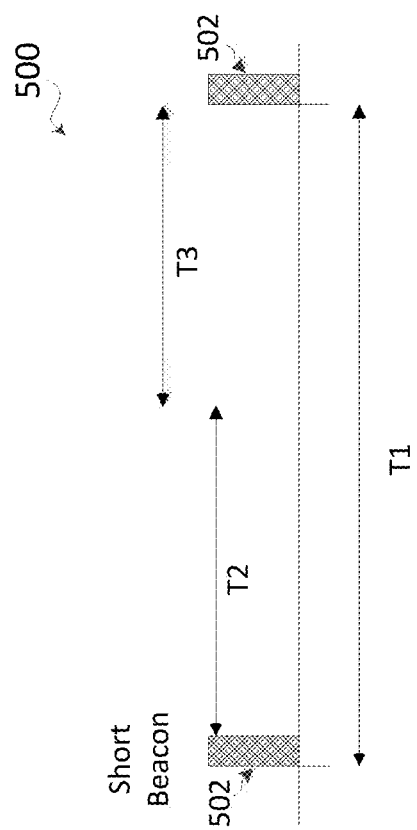
FIG. 5 is a diagram illustrating some beacon signaling aspects of a wireless communication device in accordance with various aspects of the present disclosure.
Figure 6:
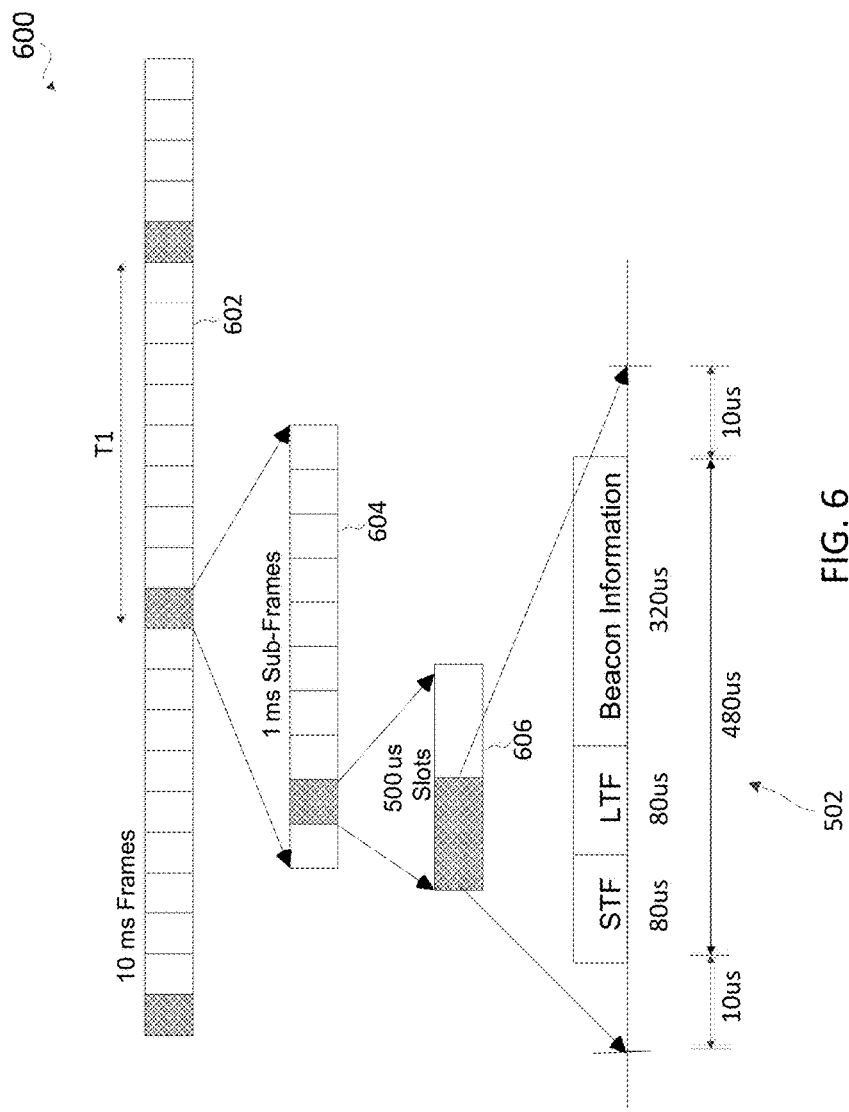
FIG. 6 is a diagram illustrating a frame structure and an exemplary beacon structure in accordance with various aspects of the present disclosure.
Figure 7:
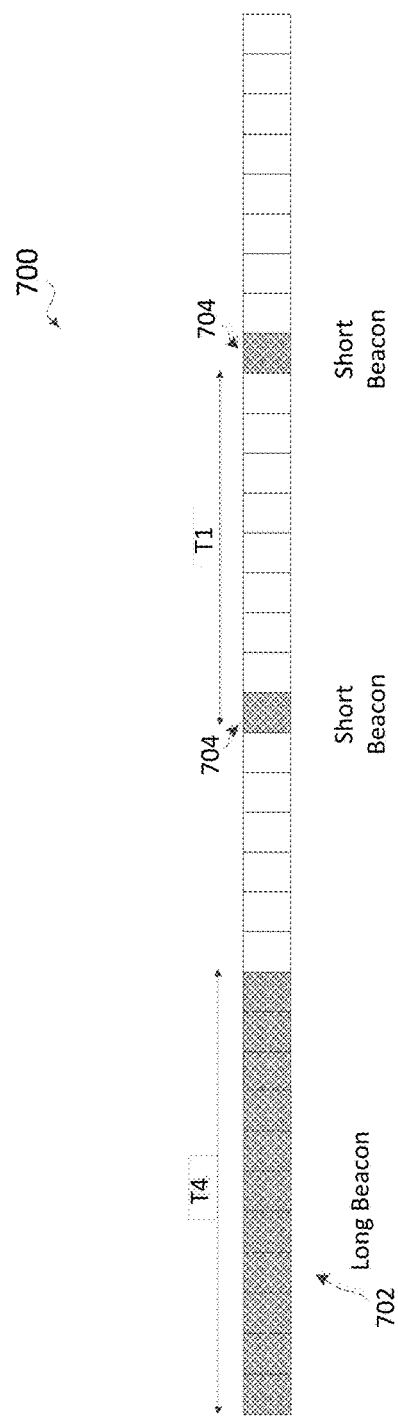
FIG. 7 is a diagram illustrating some beacon signaling aspects of a wireless communication device in accordance with various aspects of the present disclosure.

Referring now to FIGS. 5-7, aspects of beacon signals for use in coordinating communications over a shared spectrum by devices across multiple tiers in accordance with the present disclosure will be described. Referring initially to FIG. 5, shown therein is an arrangement 500 of beacon signals 502. As shown, the beacon signals 502 have a beacon interval T1. The beacon interval T1 can be larger than the minimum beacon interval allowed by regulations for the shared spectrum. The specific duration of the beacon interval T1 can be selected based on available/desired overhead for beacon signals, any regulations on beacon interval applicable to the shared spectrum, functionality of the devices to be synchronized to the beacons signals, and/or other factors. In this regard, slave devices can utilize the beacon interval T1 to determine when to go silent and listen for subsequent beacon transmissions. In some implementations, one or more tiers of device(s)/system(s) are time-synchronized based on timing signals detected from the global navigation satellite system (GNSS).

The beacon signals 502 may be wideband beacons that span the entire portion of the shared spectrum utilized by a particular tier of device. Use of such wideband beacons across the spectrum can provide frequency diversity in order to reduce the effects of fading. In other instances, the beacon signals 502 may be narrowband beacons that span only a part of the shared spectrum utilized by a particular tier of device. For example, the beacon signals 502 may be transmitted over a specific band(s) and/or channel of the shared spectrum utilized by a tier 2 device/system. Further, beacons from different devices for a common tier (e.g., second tier master 304a and second tier master 304b of FIG. 3) may transmit beacon signals over the same time slots by transmitting the beacons on the same set of tones, on disjoint sets of tones (one tone-set per node) within the time slot, or the like.

The beacon signals 502 may carry information defining a time epoch T2 that is reserved for communications by the device/system that transmitted the beacon signal 502. For example, when a second tier master transmits the beacon signal 502, the time epoch T2 can be utilized for second tier communications. As shown, a time period T3 remains following the time epoch T2 that may be utilized by other devices (e.g., other second tier devices/systems and/or third tier devices/systems) for communicating over the shared spectrum.

The beacon signals 502 may be referred to as short beacons. In this regard, the beacon signals 502 can have a short length relative to the frame structure of the associated RAT. For example, FIG. 6 illustrates an exemplary structure of the short beacon signals 502 relative to a frame structure 600 in accordance with the present disclosure. As shown, the frame structure 600 includes a plurality of frames 602, each of which is divided into a plurality of sub-frames 604, each of which is sub-divided into a plurality of slots 606. In the illustrated frame structure 600, the frames 602 have a length of 10 ms, the sub-frames 604 have a length of 1 ms, and the slots 606 have a length of 0.5 ms. However, it is understood that the concepts of the present disclosure are equally applicable to any frame structures with virtually any lengths of frames, sub-frames, and/or slots, including frame structures that may not include sub-frames and slots.

As shown, the beacon 502 includes a short training field (STF), a long training field (LTF), and a beacon information field. The beacon 502 and, in turn, the STF, LTF, and beacon information field can have various lengths. In the illustrated frame structure 600, the beacon 502 occupies a majority of the slot 606. In particular, in the illustrated embodiment the beacon 502 has overall length of 0.48 ms, with each of the STF and LTF having a length of 0.08 ms and the beacon information field having a length of 0.32 ms. As a result, this beacon structure can be utilized for any RAT where a 0.5 ms time slot can be punctured for transmission of the beacon. Accordingly, this same general beacon structure can be used across multiple types of RATs as well as across multiple tiers of device/systems to coordinate communications over a shared spectrum.

As shown, in some implementations the beacon 502 is spaced from the beginning and end of the slot 606 to allow the wireless communication device time to switch from other operations to transmission of the beacon 502 and then back to other operations all within the time of a single slot 606. In the illustrated embodiment, a 0.01 ms switching period is provided prior to the STF of the beacon 502 and a 0.01 ms switching period is provided following the beacon information field of the beacon 502. In other embodiments, the leading and trailing switching periods may have different lengths, including unequal lengths. Generally, the switching periods will occupy the remaining time within the slot 606 that is not occupied by the beacon 502 and that time can be divided in any manner between the leading and trailing switching periods.

The STF, LTF, and beacon information field can be utilized to convey information about the device/system transmitting the beacon 502 to other wireless communication devices to coordinate communications of multiple tiers of devices over a shared spectrum. For example, the beacon 502 can include a network identifier, an indication of occupied network channels/bands, a second tier enablement signal, a third tier enablement signal, a second tier reservation time, a third tier reservation time, a beacon interval, and/or other information/signals.

In some implementations the STF can be utilized by the device(s) receiving the beacon 502 to detect the presence of the device/system transmitting the beacon 502, while the LTF can be utilized for channel estimation. In some instances, the mere presence of the device/system transmitting the beacon 502 (e.g., a second tier master) may cause the receiving device (e.g., a third tier slave) to cease all communications over the channel(s) of the shared spectrum utilized by the transmitting device/system. To this end, the STF may have a format that is detectable by an autocorrelation based detector. However, more complex STF formats may be utilized in other implementations. Generally, any STF format can be utilized without departing from the scope of the present disclosure. Similarly, any LTF format and/or channel estimation techniques can utilized without departing from the scope of the present disclosure.

The beacon information field can be utilized to carry additional information about the transmitting device/system and/or instructions for the receiving device(s)/system(s). For example, the beacon information field can include a second tier enablement signal, a third tier enablement signal, a second tier reservation time, a third tier reservation time, a beacon interval, a network identifier, an indication of occupied network bands, and/or other information/signals. The receiving device(s)/system(s) can utilize the information contained in the beacon information field to coordinate communications over the shared spectrum. For example, based on the information in the beacon information field the receiving device(s)/system(s) may be able to identify time periods and/or channels that may be utilized for communications as well as identify time periods and/or channels that cannot be utilized for communications.

Referring now to FIG. 7, shown therein is an exemplary structure of beacon signals relative to a frame structure 700 in accordance with the present disclosure. In particular, a long beacon 702 and short beacons 704. Short beacons 704 may be similar to the beacons described above. The long beacon 702 can be transmitted by a device/system upon startup or after extended periods of inactivity to allow other devices/systems to detect the presence of the device/system. In this regard, the long beacon 702 transmits for a time period T4. Time period T4 can be selected based on the operation parameters of equal and/or lower tier devices/systems that should receive the long beacon 702. For example, in some implementations the time period T4 is selected by the transmitting device (e.g., a second tier device/system) to exceed a maximum allowed on time for lower tier devices/systems (e.g., a third tier device/system), such that the lower tier devices/systems will be able to detect the long beacon 702 following any ongoing transmissions.

The long beacon 702 can be comprised of a plurality of smaller beacons. In this regard, the long beacon 702 may be defined by a plurality of shorter beacons transmitted over time (e.g., every frame, every x frames, every sub-frame, every x sub-frames, every slot, every x slots, and/or other constant or variable time intervals). Each of the short beacons of the long beacon 702 can carry the same information. For example, in some implementations the short beacons of the long beacon 702 repeatedly transmit the timing for the next short beacon 704. In some implementations, the short beacons of the long beacon 702 have a structure similar to the beacons (e.g., beacon 502) described above and can carry information useful for beacon synchronization in the beacon information field in addition to or in lieu of the types of information carried in the beacon information field described above. Accordingly, the devices/systems receiving the long beacon 702 can synchronize its timing to listen for the short beacon 704. As shown in FIG. 7, following transmission of the long beacon 702, short beacons 704 can be transmitted using a standard beacon interval T1. The long beacon 702 can be utilized again at each startup of the device/system, following a long period of inactivity (e.g., each time the device/system is inactive for more than a predefined time period), periodically (e.g., every x seconds, minutes, hours, days, etc.), and/or at other suitable times. For example, in some instances the long beacon 702 can be transmitted periodically despite continued operation of the device/system to facilitate synchronization of any new devices that may come into proximity of the device/system (e.g., as a result of mobility of one or more of the devices/systems).

Figure 8:
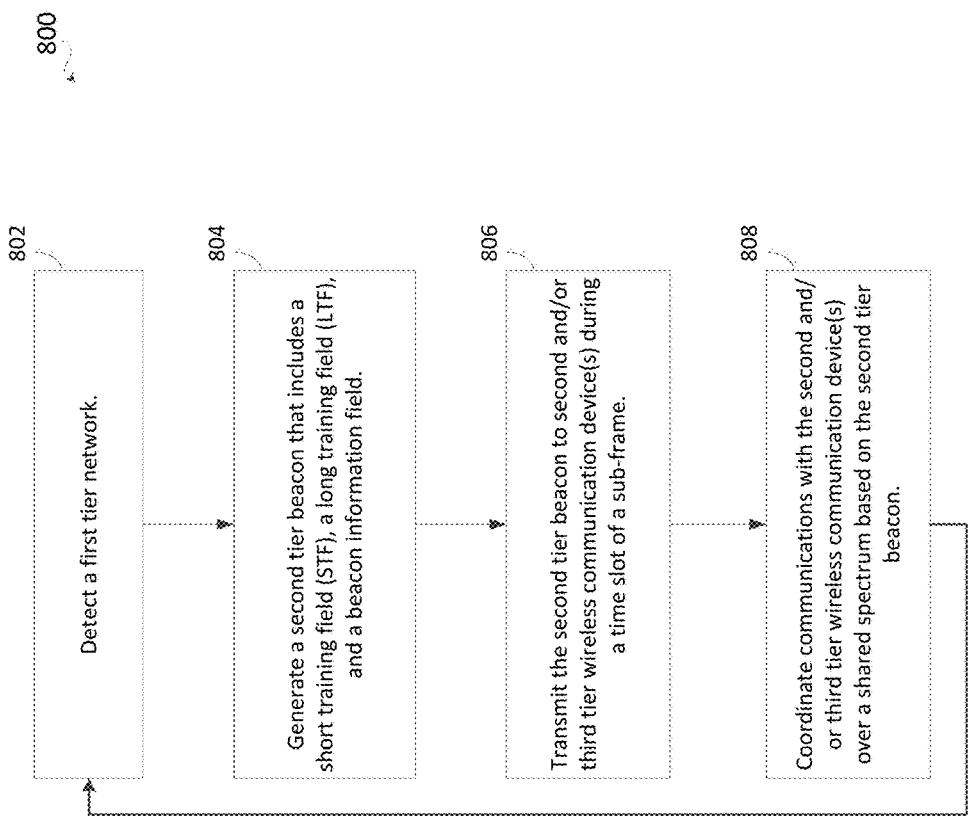
FIG. 8 is a flowchart illustrating an exemplary method for wireless communication in accordance with various aspects of the present disclosure.

Referring now to FIG. 8, shown therein is a flowchart illustrating a method 800 for wireless communication according to aspects of the present disclosure. In particular, the method 800 implements aspects of the beacon signals for coordinating multi-tiered sharing of spectrum described above from the perspective of a second tier wireless communication device, such as a second tier master device. It is understood that additional steps can be provided before, during, and after the steps of method 800, and that some of the steps described can be replaced or eliminated from the method 800. In particular, it is understood that the various aspects of the beacon signals, master and slave devices, and/or other features described above may be implemented as part of method 800.

At step 802, the second tier wireless communication device of a network operating in a shared spectrum detects a first tier network operating in the shared spectrum. As described above, the detection of higher tier networks, such as a first tier network, can be based on database lookup, sensing, and/or combinations thereof.

At step 804, the second tier wireless communication device generates a beacon that includes a short training field (STF), a long training field (LTF), and a beacon information field, the beacon information field including data about the network. The beacon can include a network identifier, an indication of occupied network bands, a second tier enablement signal, a third tier enablement signal, a second tier reservation time, a third tier reservation time, a shutdown signal, and/or a beacon interval. In some implementations, the beacon may be identical to or similar to the beacons described above in the context of FIGS. 5-7. The information carried in the beacon can be at least partially based on the detection of a first tier network at step 802. For example, the enablement signal(s), reservation time(s), and/or shutdown signal(s) can be dependent upon the detection of a first tier network at step 802 and any associated operating parameters of the detected first tier network.

At step 806, the second tier wireless communication device transmits the beacon to one or more other wireless communication devices, such as second tier slave devices, third tier slave devices, second tier master devices, or other devices. In this regard, the beacon may be transmitted during a time slot of a sub-frame as described above in the context of FIG. 6, for example. Further, the beacon may be transmitted by the second tier wireless communication device over all available bands or a subset of the available bands. In some implementations, subsequent beacons are transmitted over different bands such that the beacons are transmitted over a plurality of the available bands over time, including potentially all of the available bands.

At step 808, the second tier wireless communication device coordinates communications over the network based on the transmitted beacon. In this regard, the wireless communication device(s) receiving the beacon can determine if and when they are allowed to transmit over the shared spectrum based on the beacon. For example, the beacon may reserve a time period for the second tier wireless communication device to make transmissions over the shared spectrum and the device(s) receiving the beacon can coordinate its operations so as to not interfere with the transmissions by the second tier wireless communication device during the reserved time period. Accordingly, the second tier wireless communication device can proceed with transmissions during the reserved time period having confidence that any interference from the devices receiving the beacon should be minimal or non-existent. Following step 808, the method 800 returns to step 802.

Figure 9:
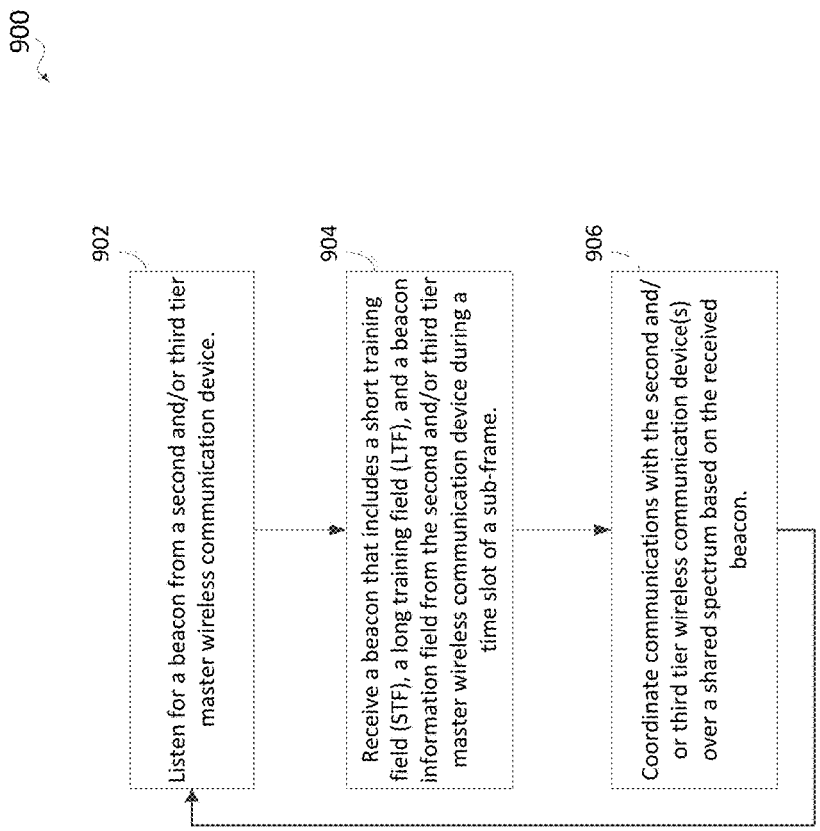
FIG. 9 is a flowchart illustrating an exemplary method for wireless communication in accordance with various aspects of the present disclosure.

Referring now to FIG. 9, shown therein is a flowchart illustrating a method 900 for wireless communication according to aspects of the present disclosure. In particular, the method 800 implements aspects of the beacon signals for coordinating multi-tiered sharing of spectrum described above from the perspective of a second, third, or lower tier wireless communication device, such as a second, third, or lower tier slave device. It is understood that additional steps can be provided before, during, and after the steps of method 900, and that some of the steps described can be replaced or eliminated from the method 900. In particular, it is understood that the various aspects of the beacon signals, master and slave devices, and/or other features described above may be implemented as part of method 900.

At step 902, the wireless communication device listens for a beacon from a second tier or third tier master device. In this regard, the wireless communication device may be synchronized to the master device(s) and, therefore, know when to listen for the beacon. For example, the wireless communication device may be aware that the beacon will be transmitted during a particular time slot of a particular sub-frame as described above in the context of FIG. 6, for example. In other instances, the wireless communication device may be listening for the beacon in an effort to become synchronized to the master device(s). For example, upon startup of the wireless communication device it may enter an extended listening period (e.g., having a time longer than an expected beacon interval of the master device(s)) in order to ensure detection of the beacon. Further, the wireless communication device may scan all available bands or a subset of the available bands for the beacon.

At step 904, the wireless communication device receives a beacon from the second tier or third tier master device(s) that includes a short training field (STF), a long training field (LTF), and a beacon information field, the beacon information field including data about the network. The beacon can include a network identifier, an indication of occupied network bands, a second tier enablement signal, a third tier enablement signal, a second tier reservation time, a third tier reservation time, a shutdown signal, and/or a beacon interval. In some implementations, the beacon may be identical to or similar to the beacons described above in the context of FIGS. 5-7. In some instances, the wireless communication device decodes the STF to detect second or third tier wireless communication activity associated with the master device transmitting the beacon. Further, in some instances the wireless communication device decodes the LTF to estimate a channel of the second or third tier wireless communication activity associated with the master device transmitting the beacon.

At step 906, the wireless communication device coordinates communications over the network based on the received beacon. In this regard, the wireless communication device can determine if and when it is allowed to transmit over the shared spectrum based on the beacon. For example, the beacon may reserve a time period for the wireless communication device to make transmissions over the shared spectrum and the other device(s) receiving the beacon can coordinate operations so as to not interfere with the transmissions by the wireless communication device during the reserved time period. As a more specific example, the wireless communication device can be a third tier device such that coordinating communications includes transmitting data during an available third tier time frame. The available third tier time frame may be identified based on a third tier enablement signal included in the received beacon. Alternatively, the available third tier time frame may be identified based on a second tier reservation time included in the beacon, where the available third tier time frame is outside of the second tier reservation time. Accordingly, due to the coordination associated with the beacon, the wireless communication device can proceed with transmissions during the reserved time period having confidence that any interference from the other devices receiving the beacon should be minimal or non-existent. Following step 906, the method 900 returns to step 902.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, comprising:
   generating, with a second tier wireless communication device of a network operating in a shared spectrum, a beacon that includes a short training field (STF), a long training field (LTF), and a beacon information field, the beacon information field including an enablement signal instructing other wireless communication devices of the second tier or a lower tier as to when communications are allowed over the shared spectrum by the other wireless communication devices; and transmitting, from the second tier wireless communication device of the network during a time slot of a sub-frame based on a predetermined schedule, the beacon including the enablement signal to instruct the other wireless communication devices of the second tier or the lower tier as to when communications are allowed over the shared spectrum by the other wireless communication devices; and coordinating, by the second tier wireless communication device of the network with the other wireless communication device of the second tier and the lower tier, communications over the shared spectrum using the transmitted beacon.

2. The method of claim 1, wherein the information included in the beacon information field includes one or more of a network identifier, an indication of occupied network bands, a second tier shared spectrum access enablement signal, a third tier shared spectrum access enablement signal, a second tier reservation time for the shared spectrum, a third tier reservation time for the shared spectrum, a shared spectrum access shutdown signal, and/or a beacon interval.

3. The method of claim 1, wherein the transmitting the beacon includes transmitting the beacon on all available bands of the network or on only a subset of available bands of the network.

4. The method of claim 1, further comprising:
periodically transmitting, from the second tier wireless communication device of the network, additional beacons at a beacon interval.

5. The method of claim 4, wherein the periodically transmitting the additional beacons includes transmitting over different bands of available bands of the network over time.

6. The method of claim 1, wherein the beacon is 500 μs or less.

7. The method of claim 6, wherein the beacon occupies only a portion of the time slot of the sub-frame to allow for switching, within the sub-frame, prior to and after transmission of the beacon.

8. The method of claim 1, further comprising repeatedly transmitting, from the second tier wireless communication device of the network, the beacon in consecutive time periods during a predetermined time period to define a long beacon.

9. The method of claim 8, wherein the predetermined time period exceeds a maximum on-time of a third tier wireless communication device, and wherein the second tier wireless communication device and the third tier wireless communication device are associated with different tiers of multiple tiers.

10. The method of claim 1, further comprising:
upon network start up, repeatedly transmitting, from the second tier wireless communication device of the network, a start-up beacon for a predetermined time period.

11. The method of claim 10, wherein the start-up beacon includes timing information for the transmission of the beacon during the time slot of the sub-frame.

12. A method for wireless communication, comprising:
receiving, at a wireless communication device, a beacon from a second tier wireless communication device of a network operating in a shared spectrum during a time slot of a sub-frame based on a predetermined schedule, the beacon including a short training field (STF), a long training field (LTF), and a beacon information field, the beacon information field including an enablement signal instructing other wireless communication devices of the second tier or a lower tier as to when communications are allowed over the shared spectrum by the other wireless communication devices, the wireless communication device is of the second tier or the lower tier; and coordinating, by the wireless communication device with the other wireless communication device of the second tier and the lower tier, communications over the shared spectrum using the received beacon.

13. The method of claim 12, wherein information included in the beacon information field includes one or more of a network identifier, an indication of occupied network bands, a second tier shared spectrum access enablement signal, a third tier shared spectrum access enablement signal, a second tier reservation time for the shared spectrum, a third tier reservation time for the shared spectrum, a shared spectrum access shutdown signal, and/or a beacon interval.

14. The method of claim 12, further comprising at least one of:
scanning all available bands of the network for the beacon; or
scanning only a subset of all available bands of the network for the beacon.

15. The method of claim 12, wherein the beacon is 500 μs or less.

16. The method of claim 15, wherein the beacon occupies only a portion of the time slot of the sub-frame.

17. The method of claim 12, further comprising:
periodically receiving, from the second tier wireless communication device of the network, additional beacons at a beacon interval; and
coordinating, by the wireless communication device, communications over the shared spectrum based on the additional beacons.

18. The method of claim 12, wherein the wireless communication device is a third tier device and wherein the coordinating communications includes transmitting data during an available third tier time frame.

19. The method of claim 18, further comprising identifying the available third tier time frame based on a third tier enablement signal included in the beacon.

20. The method of claim 18, further comprising identifying the available third tier time frame based on a second tier reservation time included in the beacon, the available third tier time frame being outside of the second tier reservation time.

21. The method of claim 12, wherein the wireless communication device is a second tier device and wherein the coordinating communications includes transmitting data during an available second tier time frame.

22. The method of claim 21, further comprising identifying the available second tier time frame based on a second tier enablement signal included in the beacon.

23. The method of claim 21, further comprising identifying the available second tier time frame based on a second tier reservation time included in the beacon, the available second tier time frame being within the second tier reservation time.

24. The method of claim 12, further comprising:
decoding, by the wireless communication device, the STF to detect second tier wireless communication activity;
decoding, by the wireless communication device, the LTF to estimate a channel of the second tier wireless communication activity; and wherein the coordinating communications over the shared spectrum includes avoiding the estimated channel of the second tier wireless communication activity.

25. A wireless communication device, comprising:
at least one processor;
a memory coupled to the at least one processor;
wherein the at least one processor is configured to:
generate a beacon that includes a short training field (STF), a long training field (LTF), and a beacon information field, the beacon information field including an enablement signal instructing other wireless communication devices of a second tier or a lower tier as to when communications are allowed over a shared spectrum in a network by the other wireless communication devices, the wireless communication device being of the second tier; and
transmit, by a transmitter of the wireless communication device during a time slot of a sub-frame based on a predetermined schedule, the beacon including the enablement signal to instruct the other wireless communication devices of the second tier or the lower tier as to when communications are allowed over the shared spectrum by the other wireless communication devices, and
wherein the processor is further configured to coordinate, with the other wireless communication device of the second tier and the lower tier, communications over the shared spectrum using the transmitted beacon.

26. The device of claim 25, wherein the information included in the beacon information field includes one or more of a network identifier, an indication of occupied network bands, a second tier shared spectrum access enablement signal, a third tier shared spectrum access enablement signal, a second tier reservation time for the shared spectrum, a third tier reservation time for the shared spectrum, a shared spectrum access shutdown signal, and/or a beacon interval.

27. The device of claim 25, wherein the beacon is transmitted, by the transmitter, on all available bands of the network or on only a subset of available bands of the network.

28. The device of claim 25, wherein the processor is further configured to periodically transmit additional beacons at a beacon interval.

29. The device of claim 28, wherein the additional beacons are periodically transmitted over different bands of available bands of the network over time.

30. The device of claim 25, wherein the beacon is 500 µs or less.

31. The device of claim 25, wherein the beacon occupies only a portion of the time slot of the sub-frame to allow for switching, within the sub-frame, prior to and after transmission of the beacon.

32. The device of claim 25, wherein the processor is further configured to repeatedly transmit the beacon in consecutive time periods during a predetermined time period to define a long beacon.

33. The device of claim 32, wherein the predetermined time period exceeds a maximum on-time of a third tier wireless communication device, and wherein the device and the third tier wireless communication device are associated with different tiers of multiple tiers.

34. The device of claim 25, wherein the processor is further configured to repeatedly transmit a start-up beacon for a predetermined time period upon network start up.

35. The device of claim 34, wherein the start-up beacon includes timing information for the transmission of the beacon during the time slot of the sub-frame.

36. A wireless communication device, comprising:
a receiver that receives a beacon from a second tier wireless communication device of a network operating in a shared spectrum during a time slot of a sub-frame based on a predetermined schedule, the beacon including a short training field (STF), a long training field (LTF), and a beacon information field, the beacon information field including an enablement signal instructing other wireless communication devices of the second tier or a lower tier as to when communications are allowed over the shared spectrum by the other wireless communication devices, the wireless communication device is of the second tier or the lower tier;
at least one processor in communication with the receiver; and
a memory coupled to the at least one processor;
wherein the at least one processor is configured to:
coordinate, with the other wireless communication device of the second tier and the lower tier, communications over the shared spectrum using the beacon received by the receiver.

37. The device of claim 36, wherein the information included in the beacon information field includes one or more of a network identifier, an indication of occupied network bands, a second tier shared spectrum access enablement signal, a third tier shared spectrum access enablement signal, a second tier reservation time for the shared spectrum, a third tier reservation time for the shared spectrum, a shared spectrum access shutdown signal, and/or a beacon interval.

38. The device of claim 36, wherein the receiver scans all available bands of the network for the beacon or scans only a subset of all available bands of the network for the beacon.

39. The device of claim 36, wherein the beacon is 500 µs or less.

40. The device of claim 39, wherein the beacon occupies only a portion of the time slot of the sub-frame.

41. The device of claim 36, wherein the receiver periodically receives, from the second tier wireless communication device of the network, additional beacons at a beacon interval; and
wherein the processor is further configured to coordinate communications over the shared spectrum based on the additional beacons.

42. The device of claim 36, further comprising a transmitter that transmits data during an available third tier time frame based on the coordination of communications by the processor.

43. The device of claim 42, wherein the processor is further configured to identify the available third tier time frame based on a third tier enablement signal included in the beacon.

44. The device of claim 42, wherein the processor is further configured to identify the available third tier time frame based on a second tier reservation time included in the beacon, the available third tier time frame being outside of the second tier reservation time.

45. The device of claim 36, further comprising a transmitter that transmits data during an available second tier time frame based on the coordination of communications by the processor.

46. The device of claim 45, wherein the processor is further configured to identify the available second tier time frame based on a second tier enablement signal included in the beacon.

47. The device of claim 45, wherein the processor is further configured to identify the available second tier time frame based on a second tier reservation time included in the beacon, the available second tier time frame being within the second tier reservation time.

48. The device of claim 36, wherein the processor is further configured to:
  decode the STF to detect second tier wireless communication activity; and
  decode the LTF to estimate a channel of the second tier wireless communication activity; and
  wherein the processor coordinates communications over the shared spectrum by avoiding the estimated channel of the second tier wireless communication activity.

49. A wireless communication device, comprising:
  means for generating, with a second tier wireless communication device of a network operating in a shared spectrum, a beacon that includes a short training field (STF), a long training field (LTF), and a beacon information field, the beacon information field including an enablement signal instructing other wireless communication devices of the second tier or a lower tier as to when communications are allowed over the shared spectrum by the other wireless communication devices; and
  means for transmitting, from the second tier wireless communication device of the network during a time slot of a sub-frame based on a predetermined schedule, the beacon including the enablement signal to instruct the other wireless communication devices of the second tier or the lower tier as to when communications are allowed over the shared spectrum by the other wireless communication devices; and
  means for coordinating, with the other wireless communication device of the second tier and the lower tier, communications over the shared spectrum using the transmitted beacon.

50. The device of claim 49, wherein the information included in the beacon information field includes one or more of a network identifier, an indication of occupied network bands, a second tier shared spectrum access enablement signal, a third tier shared spectrum access enablement signal, a second tier reservation time for the shared spectrum, a third tier reservation time for the shared spectrum, a shared spectrum access shutdown signal, and/or a beacon interval.

51. The device of claim 49, wherein the means for transmitting the beacon transmits the beacon on all available bands of the network or on only a subset of available bands of the network.

52. The device of claim 49, further comprising:
  means for periodically transmitting, from the second tier wireless communication device of the network, additional beacons at a beacon interval.

53. The device of claim 52, wherein the means for periodically transmitting the additional beacons transmits over different bands of available bands of the network over time.

54. The device of claim 49, further comprising means for constructing a long beacon by repeatedly transmitting, from the second tier wireless communication device of the network, the beacon in consecutive time periods during a predetermined time period to define a long beacon.

55. A wireless communication device, comprising:
  means for receiving, at a wireless communication device, a beacon from a second tier wireless communication device of a network operating in a shared spectrum during a time slot of a sub-frame based on a predetermined schedule, the beacon including a short training field (STF), a long training field (LTF), and a beacon information field, the beacon information field including an enablement signal instructing other wireless communication devices of the second tier or a lower tier as to when communications are allowed over the shared spectrum by the other wireless communication devices, the wireless communication device is of the second tier or the lower tier; and
  means for coordinating, by the wireless communication device with the other wireless communication device of the second tier and the lower tier, communications over the shared spectrum using the received beacon.

56. The device of claim 55, wherein the information included in the beacon information field includes one or more of a network identifier, an indication of occupied network bands, a second tier shared spectrum access enablement signal, a third tier shared spectrum access enablement signal, a second tier reservation time for the shared spectrum, a third tier reservation time for the shared spectrum, a shared spectrum access shutdown signal, and/or a beacon interval.

57. The device of claim 55, further comprising means for scanning all available bands of the network for the beacon or scanning only a subset of all available bands of the network for the beacon.

58. The device of claim 55, further comprising:
  means for periodically receiving, from the second tier wireless communication device of the network, additional beacons at a beacon interval; and
  means for coordinating communications over the shared spectrum based on the additional beacons.

59. The device of claim 55, further comprising:
  means for decoding the STF to detect second tier wireless communication activity; and
  means for decoding the LTF to estimate a channel of the second tier wireless communication activity;
  wherein the means for coordinating communications over the shared spectrum avoids the estimated channel of the second tier wireless communication activity.

60. A non-transitory computer readable medium having program code recorded thereon, the program code comprising:
  code for causing a computer to generate a beacon that includes a short training field (STF), a long training field (LTF), and a beacon information field, the beacon information field including an enablement signal instructing other wireless communication devices of the second tier or a lower tier as to when communications are allowed over a shared spectrum in a network by the other wireless communication devices, the computer associated with a second tier; and
  code for causing the computer to transmit, during a time slot of a sub-frame based on a predetermined schedule, the beacon including the enablement signal to instruct the other wireless communication devices of the second tier or the lower tier as to when communications are allowed over the shared spectrum by the other wireless communication devices; and
  code for causing the computer to coordinate, with the other wireless communication device of the second tier and the lower tier, communications over the shared spectrum using the transmitted beacon.

61. The non-transitory computer readable medium of claim 60, wherein the information included in the beacon information field includes one or more of a network identifier, an indication of occupied network bands, a second tier shared spectrum access enablement signal, a third tier shared spectrum access enablement signal, a second tier reservation time for the shared spectrum, a third tier reservation time for the shared spectrum, a shared spectrum access shutdown signal, and/or a beacon interval.

62. The non-transitory computer readable medium of claim 60, wherein the code for causing the computer to transmit the beacon causes the beacon to be transmitted on all available bands of the network or on only a subset of available bands of the network.

63. The non-transitory computer readable medium of claim 60, further comprising:
code for causing the computer to periodically transmit additional beacons at a beacon interval.

64. The non-transitory computer readable medium of claim 63, wherein the code for causing the computer to periodically transmit the additional beacons causes the additional beacons to be transmitted over different bands of available bands of the network over time.

65. The non-transitory computer readable medium of claim 60, further comprising code for causing the computer to repeatedly transmit the beacon in consecutive time periods during a predetermined time period to define a long beacon.

66. A non-transitory computer readable medium having program code recorded thereon, the program code comprising:
code for causing a computer to receive a beacon from a second tier wireless communication device of a network operating in a shared spectrum during a time slot of a sub-frame based on a predetermined schedule, the beacon including a short training field (STF), a long training field (LTF), and a beacon information field, the beacon information field including an enablement signal instructing other wireless communication devices of the second tier or a lower tier as to when communications are allowed over the shared spectrum by the other wireless communication devices, the computer being of the second tier or the lower tier; and
code for causing the computer to coordinate, with the other wireless communication device of the second tier and the lower tier, communications over the shared spectrum using the received beacon.

67. The non-transitory computer readable medium of claim 66, wherein the information included in the beacon information field includes one or more of a network identifier, an indication of occupied network bands, a second tier shared spectrum access enablement signal, a third tier shared spectrum access enablement signal, a second tier reservation time for the shared spectrum, a third tier reservation time for the shared spectrum, a shared spectrum access shutdown signal, and/or a beacon interval.

68. The non-transitory computer readable medium of claim 66, further comprising at least one of:
code for causing the computer to scan all available bands of the network for the beacon; or
code for causing the computer to scan only a subset of all available bands of the network for the beacon.

69. The non-transitory computer readable medium of claim 66, further comprising:
code for causing the computer to periodically receive, from the second tier wireless communication device of the network, additional beacons at a beacon interval; and
code for causing the computer to coordinate communications over the shared spectrum based on the additional beacons.

70. The non-transitory computer readable medium of claim 66, further comprising:
code for causing the computer to decode the STF to detect second tier wireless communication activity;
code for causing the computer to decode the LTF to estimate a channel of the second tier wireless communication activity; and
code for causing the computer to avoid the estimated channel of the second tier wireless communication activity.

* * * * *